United States Patent
DeMeritt et al.

(10) Patent No.: US 6,477,297 B1
(45) Date of Patent: Nov. 5, 2002

(54) REDUCTION OF BEND LOSS THROUGH CONSTRAINT OF OPTICAL FIBER PARAMETERS

(75) Inventors: Jeffery A. DeMeritt, Painted Post, NY (US); Zagorka D. Gaeta, Ithaca, NY (US); Peter G. Wigley, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/520,539

(22) Filed: Mar. 8, 2000

(51) Int. Cl.$^7$ ................................................. H01S 3/00

(52) U.S. Cl. ........................ 385/32; 359/333; 359/337

(58) Field of Search ........................... 385/32; 359/333, 359/337; 372/6

(56) References Cited

U.S. PATENT DOCUMENTS

| | | | |
|---|---|---|---|
| 5,278,931 A | | 1/1994 | Smith et al. |
| 5,363,234 A | * | 11/1994 | Newhouse et al. ......... 359/341 |
| 5,544,272 A | | 8/1996 | Carratt et al. |

FOREIGN PATENT DOCUMENTS

| | | | |
|---|---|---|---|
| EP | 0 334 247 | | 9/1989 |
| EP | 0470497 A2 | * | 2/1992 |

OTHER PUBLICATIONS

Sharma, A. B. et al, "Constant–Curvature Loss in Monomode Fibers: An Experimental Investigation", Applied Optics, vol. 23, No. 19, Oct. 1, 1984, pp. 3297–3301.

Unger, C. et al, "Characterization of the Bending Sensitivity of Fibers by the MAC–Value", Optics Communications 107, May 1, 1994, pp. 361–364.

Arnaud, J. A., "Transverse Coupling in Fiber Optics Part III: Bending Losses", The Bell System Technical Journal, vol. 53, No. 7, Sep. 1974, pp. 1379–1394.

Faustini, Luca et al, "Bend Loss in Single–Mode Fibers", Journal of Lightwave Technology, vol. 15, No. 4, Apr. 1997, pp. 671–679.

Taylor, Henry F., "Bending Effects in Optical Fibers", Journal of Lightwave Technology, vol. LT–2, No. 5, Oct. 1984, pp. 617–628.

Kaufman, K.S. et al, "Curvature Loss in Multitude Optical Fibers", Optical Society in America, vol. 71, No. 12, Dec. 1981, pp. 1513–1518.

Tangonan, G.L. et al, "Bend Loss Measurements for Small Mode Field Diameter Fibres", Electronic Letters, vol. 25, No. 2, Jan. 19, 1989, pp. 142–143.

Marcuse, D., "Influence of Curvature on the Losses of Doulby Clad Fibers", Applied Optics, vol. 21, No. 23, Dec. 1, 1982, pp. 4208–4213.

Marcuse, D., "Field Deformation and Loss Caused by Curvature of Optical Fibers", Optical Society of America, vol. 66, No. 4, Apr. 1976, pp. 311–320.

Marcuse, D., "Curvature Loss Formula for Optical Fibers", Optical Society of America, vol. 66, No. 3, Mar. 1976, pp. 216–220.

* cited by examiner

Primary Examiner—Akm E. Ullah
Assistant Examiner—Jerry T Rahll
(74) Attorney, Agent, or Firm—Svetlana Short (57) ABSTRACT

A method of assembling an optical system includes the steps of: (i) selecting, from a plurality of optical fibers characterized by a common nominal cut-off wavelength $\lambda_{cn}$ and an actual cut-off wavelength $\lambda_c$ such that the cut-off wavelength $\lambda_c$ of each one of this plurality of fibers is the same as the nominal cut-off wavelength $\lambda_{cn}$ or differs slightly from the nominal cut-off wavelength due to manufacturing tolerances, only fibers with $\lambda_c > \lambda_{min}$, where $\lambda_{min}$ is a predetermined minimum acceptable cut-off wavelength of the selected fibers; and (ii) bending at least one section of at least one of these selected fibers such that this bent section has a bend radius R, where 12 mm<R<18 mm.

22 Claims, 6 Drawing Sheets

BEND LOSS FOR DIFFERENT BEND RADII (assumed average core radius)

REDUCTION OF BEND LOSS THROUGH CONSTRAINT OF OPTICAL FIBER PARAMETERS

BACKGROUND OF THE INVENTION

1. Field of the Invention

This invention relates to bent optical fibers, to optical systems such as optical amplifiers incorporating such fibers and, to a method of assembling such optical systems.

2. Technical Background

It is well known, throughout the photonics industry, that insertion loss due to macrobending in single-mode fiber increases with smaller radius of curvature and with longer wavelength of the transmitted light. This knowledge has led to standard practices for the deployment of optical fiber in spliced concatenations of pigtailed components such as Erbium doped fiber amplifiers (EDFAs) and Multiplexing/Demultiplexing assemblies. Macrobending is typically controlled in the design of optical systems by ensuring that the fiber is bent around large radii such as 25 mm or greater. This approach, however, works in direct opposition to the requirement of reducing the size of the optical systems. Furthermore, the macrobend losses become larger when the signal wavelength is longer, which is required in long-band (L-band) amplifiers. A long band amplifier is an amplifier that operates in an approximately 1560 nm to approximately 1625 nm wavelength range. Sometimes the bent optical pigtails are utilized in optical systems that operate at even longer wavelengths, for example about 1650 nm.

As we seek to reduce the overall size of optical systems comprising concatenated optical components, we need to be able to bend or coil the pigtails more tightly and simultaneously avoid increase in bend losses.

SUMMARY OF THE INVENTION.

According to one aspect of the present invention a method of assembling an optical system includes the steps of:

(i) selecting, from a plurality of optical fibers characterized by a common nominal cut-off wavelength $\lambda_{cn}$ and an actual cut-off wavelength $\lambda_c$ such that the cut-off wavelength $\lambda_c$ of each one of this plurality of fibers is the same as the nominal cut-off wavelength $\lambda_{cn}$ or differs slightly from the nominal cut-off wavelength due to manufacturing tolerances, only fibers with $\lambda_c > \lambda_{min}$, where $\lambda_{min}$ is a predetermined minimum acceptable cut-off wavelength of the selected fibers; and (ii) bending at least one section of at least one of these selected fibers such that this bent section has a bend radius R, where 12 mm<R<18 mm.

According to one embodiment of the present invention, the method of assembling an optical amplifier comprises the steps of: (i) manufacturing a plurality of optical fibers, the fibers being single-mode fibers that have a common nominal cut-off wavelength $\lambda_{cn} \geq 1290$ nm; (ii) and bending at least one section of at least one of these fibers such that this bent section has a bend radius R, where 12 mm<R<18 mm.

According to an embodiment of the present invention an optical system is selected from at least 10 optical systems which are identical except for differences due to manufacturing tolerances. Each of these optical systems includes bent optical fiber pigtails having: (i) a bend radius R, such that 12 mm<R<18 mm; (ii) a common design cut-off wavelength $\lambda_{cn}$, and (iii) an actual cut-off wavelength $\lambda_c$, such that the cut-off wavelength $\lambda_c$ of each of the optical fibers of these pigtails is larger than the same or larger than $\lambda_{cn}-1.5\Delta$, where $\Delta$ is a standard deviation of $\lambda_c$ distribution.

According to an embodiment of the present invention, a method of assembling an optical amplifier comprises the steps of:

(i) manufacturing a plurality of optical fibers, the optical fibers being single-mode fibers that are characterized by a common nominal Mac number $MAC_n$, such that the Mac number MAC of each of the optical fibers is the same as the nominal Mac number $MAC_n$ or differs slightly from the nominal Mac number due to manufacturing tolerances;

(ii) selecting from these optical fibers only fibers that satisfy the following equation MAC<$MAC_n+\Delta$, where $\Delta$ is a standard deviation of Mac number distribution of said plurality of optical fibers; and (iii) bending at least one section of at least one of these selected fibers such that this bent section has a bend radius R, where 12 mm<R<18 mm.

According to an embodiment of the present invention a method of assembling an optical amplifier comprises the steps of: (i) selecting from a plurality of optical fibers only fibers that satisfy the following equation MAC<7.0, where MAC is a Mac number of each of the selected fibers; the plurality of optical fibers being single-mode fibers; (ii) and bending at least one section of at least one of the selected fibers such that this bent section has a bend radius R, where 12 mm<R<18 mm.

According to one embodiment of the present invention an optical system selected from at least 10 optical systems which are identical except for differences due to manufacturing tolerances, each of the optical systems including optical fiber pigtails having: (i) a bend radius R, such that 12 mm<R<18 mm; (ii) a common design Mac number $MAC_n$; and (iii) an actual Mac number MAC, such that the actual Mac number MAC of each of the fibers is the same or smaller than said common design Mac number $MAC_n$.

It is an advantage of this invention that optical amplifiers and other optical devices of the present invention can utilize strongly bent optical fiber (with bend radius of 12 to 18 mm) without suffering from extensive macrobend losses and, thus, can be more compact and operate at longer wavelengths.

For a more complete understanding of the invention, its objects and advantages refer to the following specification and to the accompanying drawings. Additional features and advantages of the invention are set forth in the detailed description, which follows.

It should be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various features and embodiments of the invention, and together with the description serve to explain the principles and operation of the invention.

DETAILED DESCRIPTION OF THE PREFERRED EMBODIMENTS

To get the full benefit from the optical power carried by concatenated optical assemblies while reducing their overall size and moving towards longer wavelengths (commonly referred to as L-Band) it is desirable to reduce the optical impact of macrobending, both in loss budget and ripple or flatness. Macrobend loss affects manufacturing yields directly, by reducing the power conversion efficiency, and indirectly, by increasing the loss variance. Loss variance is a significant yield driver in manufactured optical assemblies. Optical assemblies, such as optical amplifiers, for example, utilize several pigtailed components. That is, input optical power and an output optical power provided to and by these components is channeled through optical fibers, called pigtails. These pigtails are usually bent or coiled for compactness.

The physical mechanism of bend loss can be understood by considering an optical wavefront propagating in a waveguide. In a straight waveguide all the points that have the same phase form a planar wavefront, perpendicular to the optical axis. This is no longer true when the optical wavefront encounters a bend in the waveguide. In order for every point in the wavefront to remain in phase, the points of the optical wavefront that are located farther from the center of the curvature (of the bend) need to travel faster than those closer to the center. For a given curvature of the bend the wavefront points that are farther than some distance Rmax from the center of curvature need to travel at a velocity that exceeds the speed of light in the cladding. As a result, this part of the optical wavefront is not guided through the waveguide, but is radiated and lost.

That is, the fiber carrying optical power loses some of this power. This loss is called macrobend loss. It is well known that macrobend loss of a single-mode fiber increases with decreasing bend radius and with increase in wavelength of the transmitted light. The amount of macrobend loss also depends on fiber parameters, for example, core-to-cladding refractive index difference and the core radius. The fiber parameters vary in the manufactured pool of a given fiber type as a consequence of the intrinsic variability of the manufacturing process. The fiber parameter variation results in a large variation in bend loss sensitivity over the fiber population. One aspect of the present invention pertains to the selection or manufacture of special optical fibers to control loss from macrobending in optical assemblies.

Figure 1:
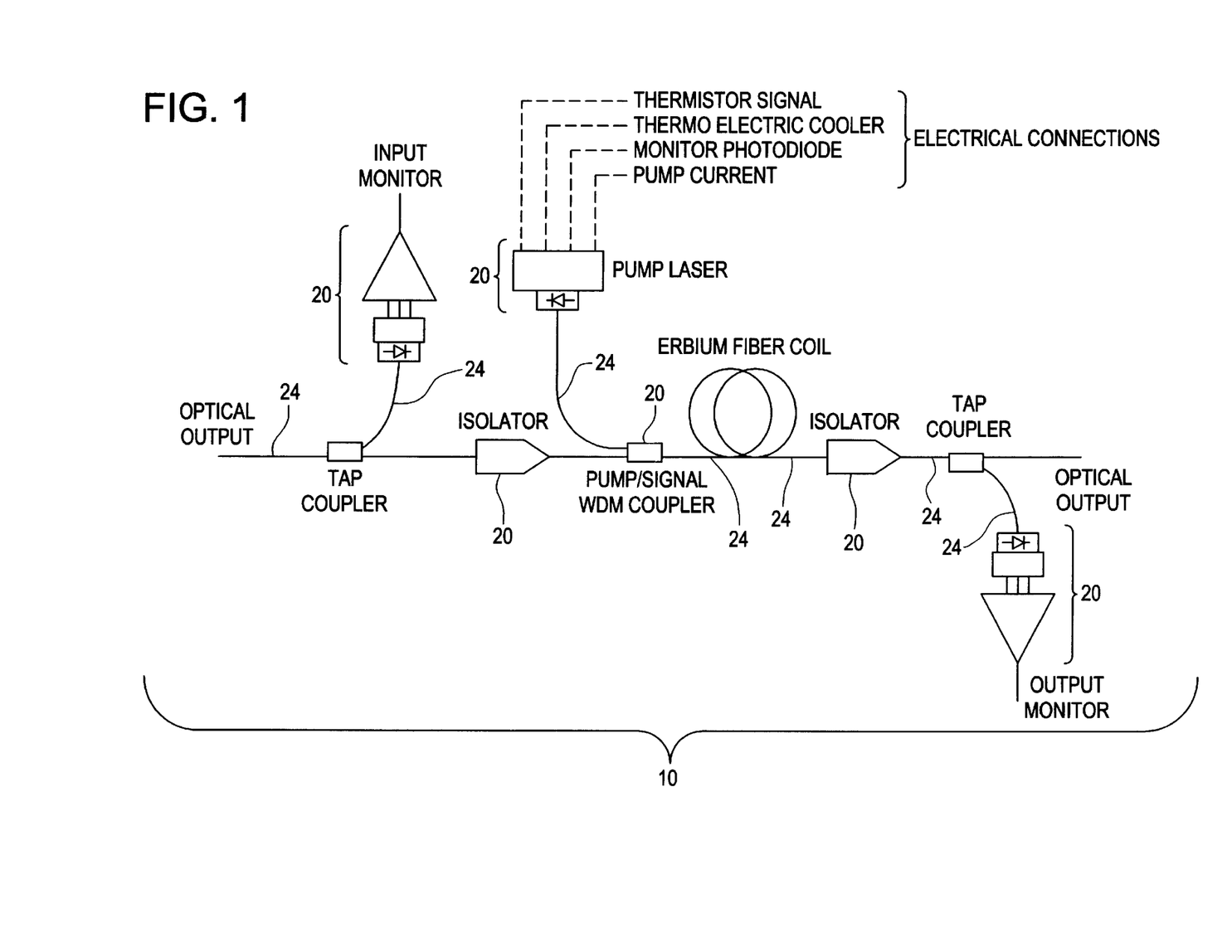
FIG. 1 illustrates schematically an optical amplifier that includes pigtailed optical components.
Figure 2:
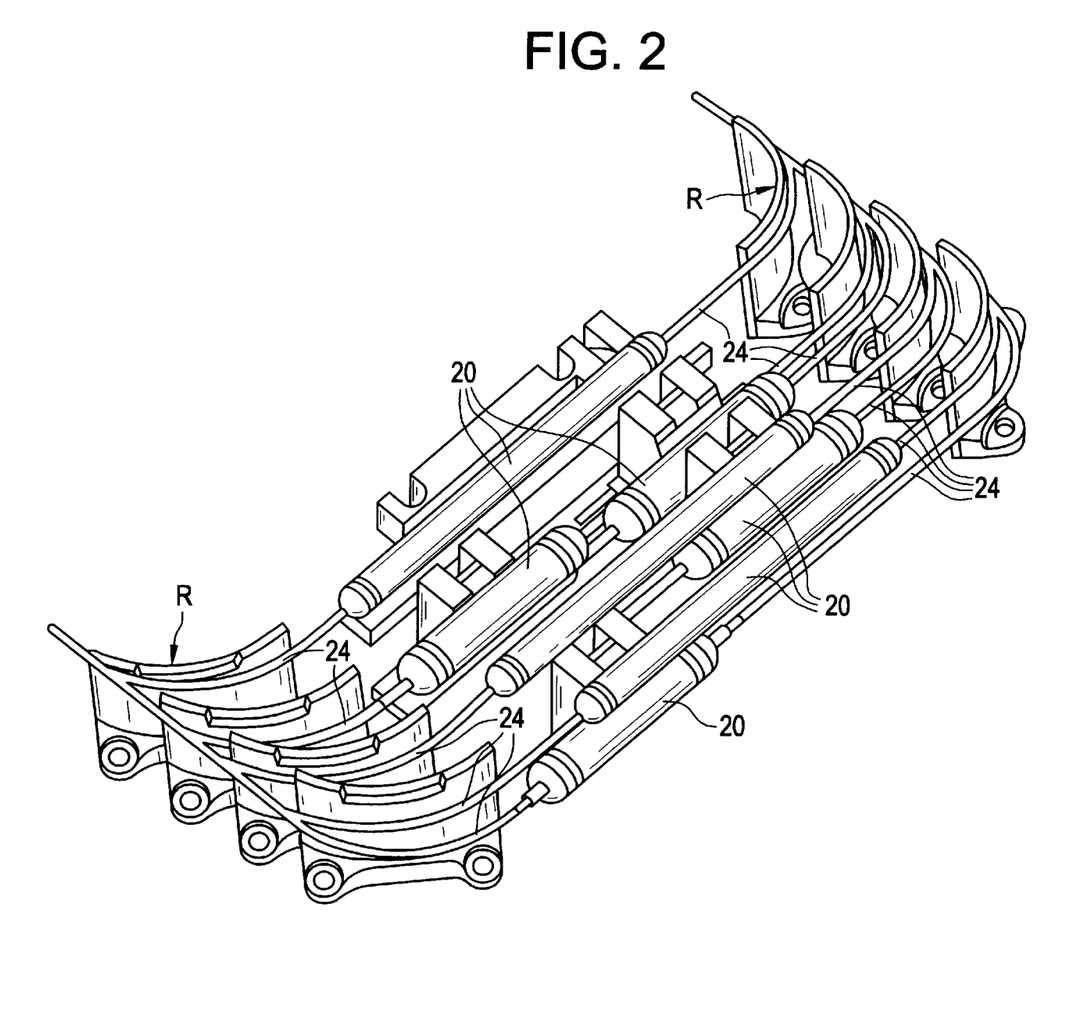
FIG. 2 is an enlarged perspective view illustrating routing of pigtails around bends on an assembly platform.

FIG. 1 illustrates schematically an optical amplifier 10 that includes a plurality of optical components 20 with pigtails 24. In this embodiment, the pigtails 24 are made of single-mode optical fiber and have a 16 mm bend radius. The optical amplifier 10 has minimal macrobend losses and provides high optical performance. FIG. 2 is an enlarged perspective view of a portion of an optical amplifier 10. This figure illustrates seven optical components 20 and twelve bent pigtails 24. A typical L-band optical amplifier may have, for example, 30 wraps of a bent fiber. While some fibers might contribute significant loss in one wrap, generally each coil and each bent fiber contributes a relatively small amount of loss to the overall amplifier. Together, the losses and their variations add up and are cumulatively significant. One of the advantages of the present invention is that the coiled and bent fibers present in the optical systems such as optical amplifiers of the present invention contribute much smaller amount of loss and, therefore, the cumulative amount of light loss due to macrobending is greatly reduced.

Figure 3:
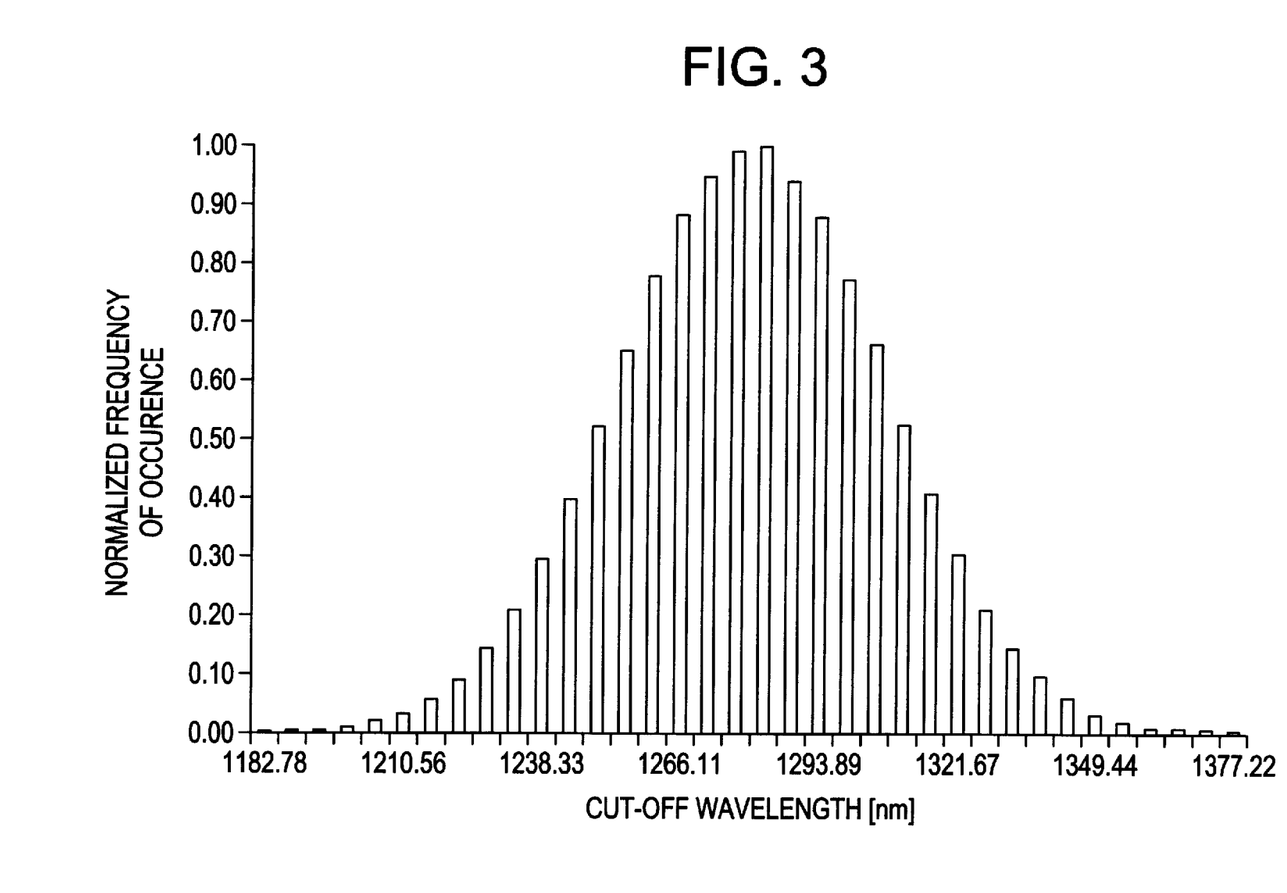
FIG. 3 illustrates a typical distribution of cut-off wavelengths in a production batch of typical single-mode fibers.

The exemplary pigtails 24 are made from single-mode transmission (also referred to as a communication) fiber, such as fiber sold by Corning incorporated under trademark SMF-28™, for example. Such fiber is characterized by a nominal (also referred to as design) cut-off wavelength $\lambda_{cn}$. Typically, $\lambda_{cn}$ is 1260 nm or higher for optical single-mode fibers. For fiber such as the SMF-28™ fiber the nominal cut-off wavelength $\lambda_{cn}$ is approximately 1280 nm. The standard production batch of optical fiber would include a plurality of almost identical optical fibers. However, due to variability of the manufacturing process and the associated manufacturing tolerances, the actual cut-off wavelength $\lambda_c$ of any given fiber will differ somewhat from the nominal cut-off wavelength $\lambda_{cn}$. (As used herein, $\lambda_c$ is defined by the FOTP #80 standard). A typical distribution of $\lambda_c$ for a typical batch of fiber is shown in FIG. 3. In this figure, the horizontal axis depicts the cut-off wavelength $\lambda_c$ of the optical fibers and the vertical axis corresponds to numbers of fibers (i.e., frequency of occurrence) within a specified range of cut-off wavelengths. FIG. 3 illustrates that in this batch of fibers the distribution of $\lambda_c$ is approximately Gaussian and that half of the fibers have a cut-off wavelength $\lambda_c$ that is smaller than $\lambda_{cn}$ and half of the fibers have a cut-off wavelength $\lambda_c$ that is larger than $\lambda_{cn}$. We discovered that when all fiber pigtails on a given optical path are made from standard production fiber selected for high cut-off wavelength, macrobend losses are reduced. For example, when the optical fibers with 10% lowest $\lambda_c$ distribution were not used to make optical pigtails, the optical systems utilizing the other 90% of optical fiber for the pigtails (i.e., the pigtails made of the optical fibers selected to have $\lambda_c$ in the top 90% of the distribution) suffered from significantly smaller macrobend losses than the optical systems where optical fibers from the entire distribution were used for the pigtails. Furthermore, these pigtails could be used to propagate longer wavelength light (1625 nm–1650 nm) with macro bend losses that are similar to that of the pigtails that propagate shorter wavelength light 1525–1550 nm). We discovered that when only the fibers with a $\lambda_c$ that is larger than $\lambda_{cn}$ were used as pigtails, deleterious macrobending effects were greatly reduced. For example, ninety five percent of the SMF-28™ fiber produced by Corning Incorporated in a particular month had a predicted macrobend loss of 0.3 dB or less per 30 mm (mandrel diameter) wrap at a wavelength of 1600 nm and 0.03 dB loss at a wavelength of 1520 nm. Selecting from this month's production only the optical fibers with a top five percent cut-off distribution reduced the predicted maximum loss due to macro bending to 0.01 dB per 30 mm wrap at the 1600 nm wavelength and almost identical loss at wavelength of 1520 nm. That is, the macrobend loss was reduced and the amount of loss was so small that it did not change appreciably with wavelength. Because the amount of macrobend loss was greatly reduced when the optical fibers with a top five percent cut-off distribution were used, it is possible to use such fibers in pigtails that are bent or coiled with much smaller radii of curvature than those typically recommended by those with ordinary skill.

Similar results in bend-loss improvement are obtained when pigtail fiber is designed to have $\lambda_{cn} \geq 1290$ nm and preferably $\lambda_{cn} \geq 1300$ nm as a nominal cut-off wavelength. That is, specifying a batch of fibers with a high nominal cut-off frequency such as 1300 nm or higher, instead of a standard 1280 nm, will shift the entire bell-shape curve of FIG. 3 to the right by centering it about 1300 nm and, therefore, would greatly reduce the amount of macrobend loss in pigtails made of this batch of fibers.

Figure 4:
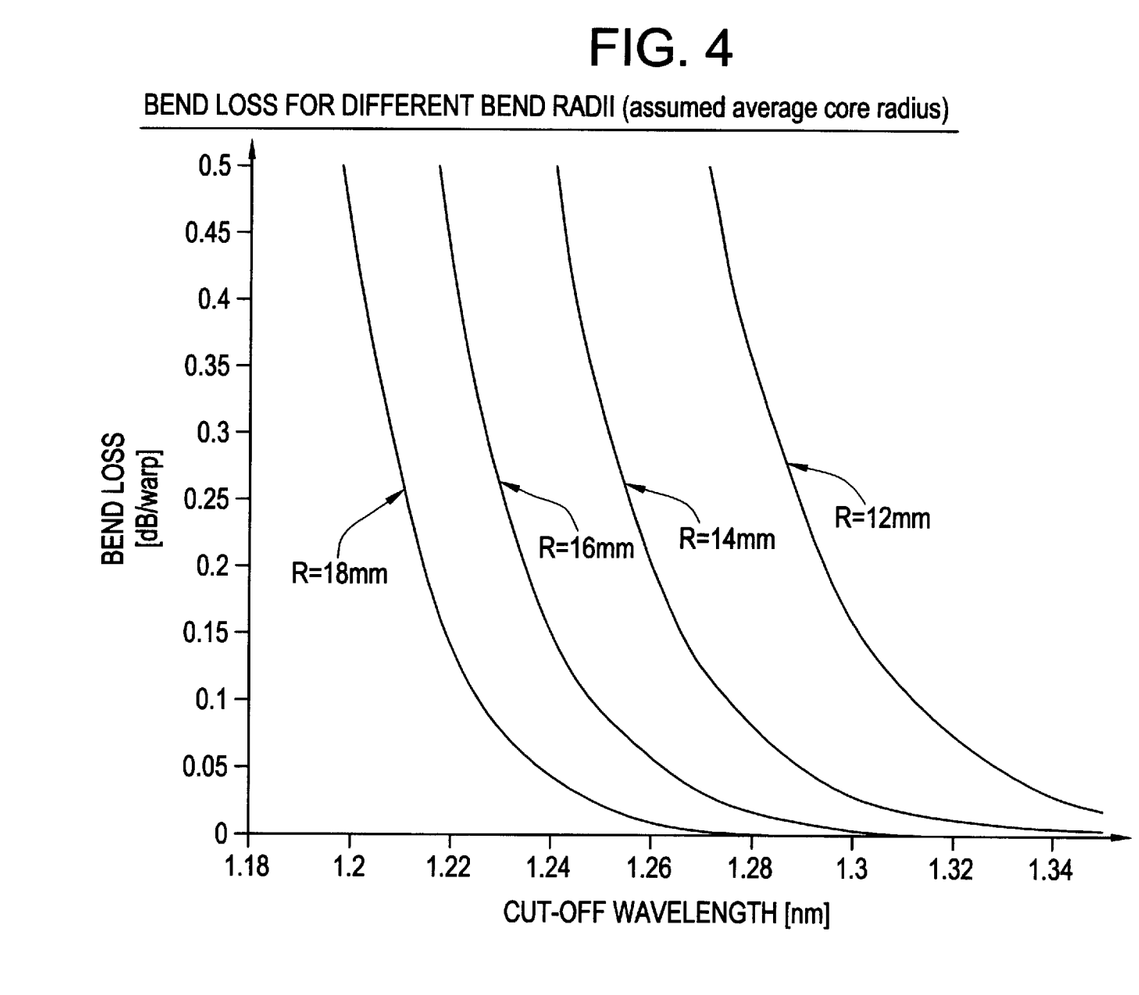
FIG. 4 is a plot illustrating the dependence of bend loss at different bend radii on the cut-off wavelength.

FIG. 4 illustrates that utilizing fibers with a cut-off wavelength $\lambda_c > \lambda_{cn} = 1280$ nm greatly reduces the effect of macrobending. More particularly, FIG. 4 illustrates the effect of cut-off wavelength on the bend loss for a typical fiber with the average core radius at different bend radii R. It is desired that the bend loss/per wrap of a fiber be about 0.05 dB or smaller. It is preferred that the bend loss/per wrap of a fiber be less than 0.025 dB. It is even more preferred that loss/per wrap of a fiber be about 0.01 dB and most preferably about 0.001 dB. Thus, if the optical fiber has a cut-off wavelength of 1300 nm instead of 1280 nm, one can have pigtails with a bend radius R of 14 mm. Similarly, by specifying that $\lambda_c$ is 1320 nm, one can have pigtails with a bend radius R of 12 mm. By specifying 1300 nm cut-off wavelength one can have pigtails with a bend radius R of 16 mm and macrobend losses that are about one third of the macrobend losses suffered by pigtails made of similar fibers with a cut-off wavelength of 1280 nm.

Figure 5:
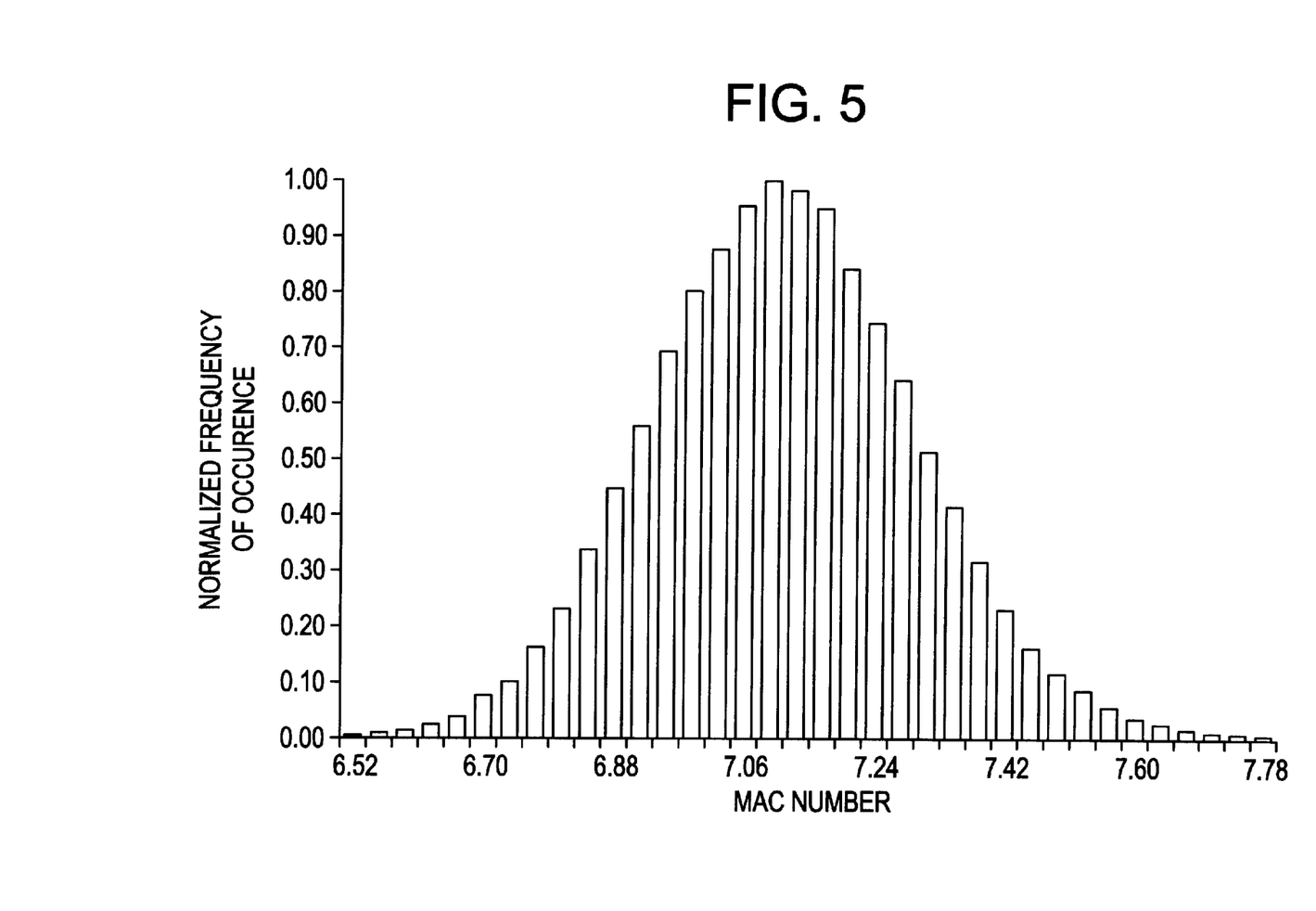
FIG. 5 illustrates a typical distribution of Mac numbers in a production batch of typical single-mode fibers.
Figure 6:
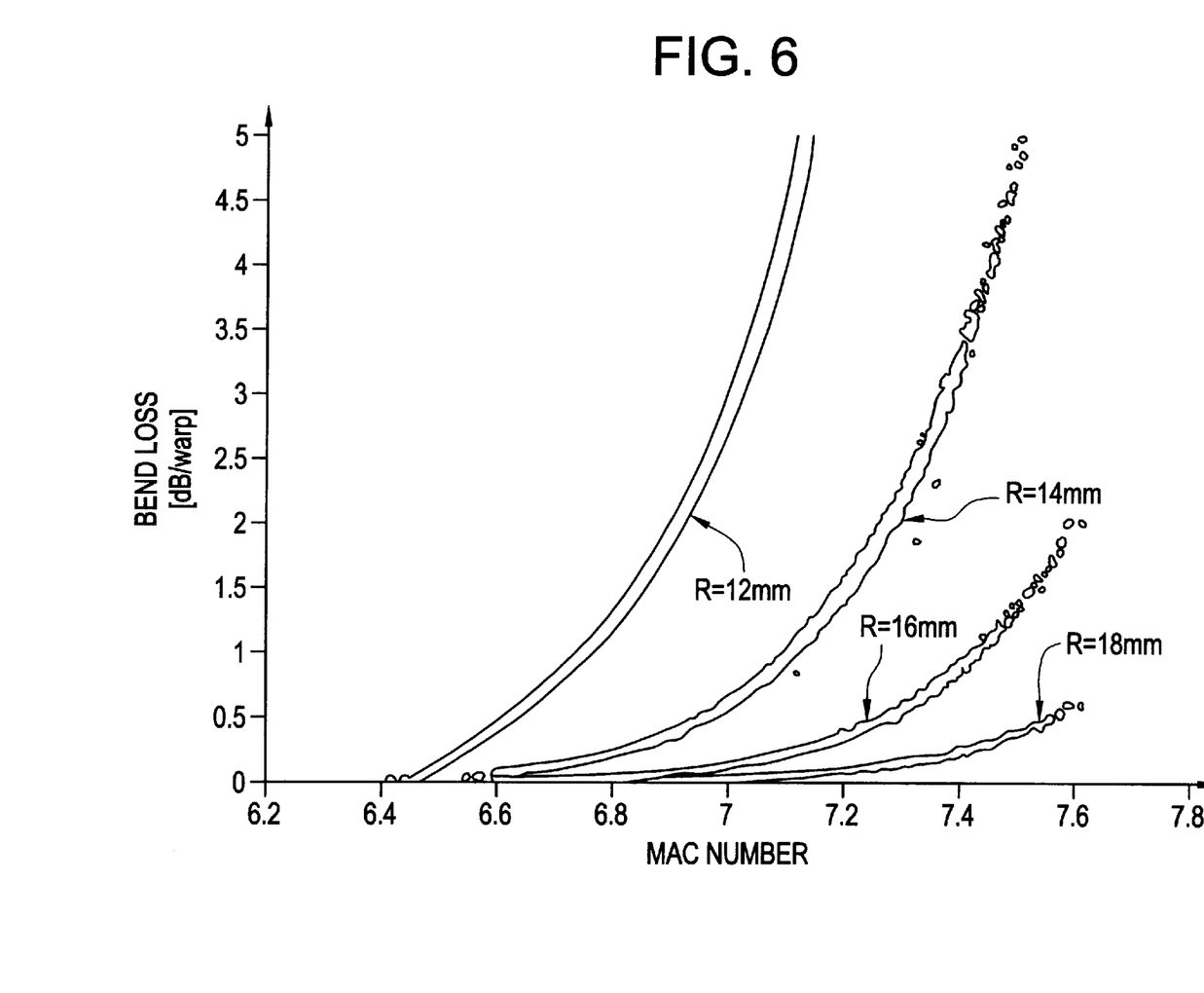
FIG. 6 is a plot from a Monte-Carlo simulation illustrating the degree of correlation between bend loss and Mac number for a plurality of optical fibers from a common manufacturing process.

Optical fiber may also be characterized by its Mac number (MAC). The Mac number is the modefield diameter (MFD) of the optical fiber divided by the fiber's cut-off wavelength $\lambda_c$, i.e. MAC=MFD/$\lambda_c$. The mode field diameter MFD is measured at the wavelength of 1310 nm. Due to variability of the manufacturing process and the resulting manufacturing tolerances, the actual Mac number (MAC) of any given fiber will differ somewhat from the average or nominal Mac number $MAC_n$. A typical distribution of Mac numbers for a typical batch of fibers is provided in FIG. 5. In this figure, the horizontal axis depicts the Mac numbers of the optical fibers and the vertical axis corresponds to numbers of optical fibers with this Mac number. FIG. 5 illustrates that Mac number distribution is approximately Gaussian with a standard deviation of about 0.17. About half of the fibers have Mac numbers that are smaller than the nominal Mac number ($MAC_n$) of 7.1 and half of the fibers have Mac numbers that are larger than this average Mac number $MAC_n$. Because the amount of macrobend loss is greatly reduced when the bent optical fibers have larger than average Mac numbers, it is possible to utilize such fibers in pigtails that are bent or coiled with much smaller radii of curvature than those typically recommended by those with ordinary skill in the art of optical fiber amplifiers. FIG. 6 indicates that if one selects only the optical fibers with MAC numbers that are smaller than $MAC_n$, and that preferably are ½ standard deviation (½Δ) below the nominal Mac number $MAC_n$ (i.e., MAC≦$MAC_n$-Δ/2) for pigtails, the macrobend losses are significantly lower. For this reason, it is more preferable that optical fibers are selected to satisfy the following equation MAC≦$MAC_n$-Δ and even more preferable that MAC≦$MAC_n$-1.5Δ. Similar results in bend-loss improvement are obtained when the optical fiber is designed to have the nominal MAC number of 7 or smaller, instead of a standard 7.1. Thus, if optical fibers are to be tightly coiled or bent (so that its bend radius R is equal or is smaller than 18 mm), it is preferable to use optical fibers with Mac numbers of that are smaller than 7.1. It is preferable to use fibers with Mac numbers that are 7.05 or smaller and more preferable to use fibers with Mac numbers of 7.0 or smaller. It is even more preferable to use fibers with MAC numbers equal to or smaller than 6.9 or 6.8. It is most preferable, for macrobend loss minimization, to have fibers with Mac numbers of 6.7 and preferably 6.6 or smaller. Finally, if one utilizes optical fibers with small Mac numbers for pigtails by either selecting a predetermined portion of a typical distribution or by designing fibers to have smaller nominal Mac numbers, one can utilize these pigtails to propagate longer wavelength light (for example, 1650 nm) and have macrobend losses that are similar to that of pigtails propagating shorter wavelength light (for example, 1580 nm).

If a manufactured optical system (such as an optical amplifier), according to one aspect of the present invention, is selected from a plurality of manufactured optical systems, where the plurality of manufactured optical systems is composed of at least 5 and preferably at least 10 optical systems which are identical except for differences due to manufacturing tolerances, it will have the following parameters and behavior when analyzed with respect to a nominal or design optical system having nominal parameter values.

The plurality of manufactured optical systems have pigtails made of optical fibers defined by a nominal cut-off wavelength $\lambda_{cn}$ and a nominal Mac number MAC. Each of the manufactured optical systems has optical fiber pigtails that are characterized by (i) a bend radius R, such that 12 mm≦R≦18 mm, (ii) a common design cut-off wavelength $\lambda$cn; and (iii) an actual cut-off wavelength $\lambda_c$, such that the cut-off wavelength $\lambda_{cn}$ of each of said fibers is $\lambda_c \geq -1.5\Delta$, where Δ is the standard distribution of $\lambda_c$. It is preferable that $\lambda_c \geq \lambda_{cn} - \Delta$. It is more preferable that $\lambda_c \geq \lambda_{cn} - 0.5\alpha$ and it is even more preferable for $\lambda_c$ be the same or slightly larger than said nominal cut-off wavelength $\lambda_{cn}$. It is most preferable that $\lambda_c \geq \lambda_{cn} + \Delta$. Typically $\lambda_{cn}$ will be in the range of 1260 nm≦$\lambda_{cn}$ ≦1320 nm.

Alternatively each of the manufactured optical systems has optical fiber pigtails made of optical fibers that are characterized by (i) a bend radius R, such that 12 mm≦R≦18 mm, (ii) a common design Mac number $MAC_n$, and (iii) a Mac number MAC, such that the Mac number MAC of each one of these optical fibers is MAC≦$MAC_n$+ 1.5Δ, where Δ is the standard distribution of Mac numbers. It is preferable that MAC≦$MAC_n$+Δ. It is more preferable that MAC≦$MAC_n$+0.5Δ and it is even more preferable for MAC be the same or slightly smaller than said nominal Mac number $MAC_n$. It is most preferable that MAC≦MAC-Δ. It is noted that for pigtails used in optical amplifiers the nominal Mac number $MAC_n$ is typically between 7.0 and 7.2. The nominal Mac number $MAC_n$ of the SMF-28™ fiber is about 7.1. Thus, if a plurality of manufactured optical systems were taken, such that these optical systems are identical except for differences due to manufacturing tolerances, and the optical fibers of the pigtails were measured, the distribution of Mac numbers and $\lambda_c$ of these fibers would not be Gaussian, because the optical fibers with lowest cut-off wavelengths and highest Mac numbers were selected out and not used for the pigtails.

Similarly, if a manufactured optical system (for example, an optical amplifier, a wave division multiplexer, wave division de-multiplexer, or any other system that utilizes bent optical fiber pigtails), according to one aspect of the present invention, is selected from a plurality of manufactured optical systems, where the plurality of manufactured optical systems is composed of a plurality of optical systems (5, 10, or 20, for example) which are identical except for differences due to manufacturing tolerances, it will have the following parameters and behavior: the plurality of manufactured optical systems will have pigtails made of optical fiber defined by an average cut-off wavelength $\lambda_{cn}$ and an average Mac number $MAC_n$. Each of the manufactured optical systems have optical fiber pigtails that are characterized by (i) a bend radius R, such that 12 mm≦R≦18 mm; (ii) an average design cut-off wavelength that equals to or larger than 1290 nm and preferably equal to or larger than 1300 nm, or the average Mac number that is smaller than 7.1. The average Mac number is calculated by summing the Mac numbers of the optical fibers constituting all of the pigtails in all of said manufactured optical systems and dividing this sum by the number of these optical fibers. The average cut-off wavelength is calculated by summing the cut-off wavelength of the optical fibers constituting all of the pigtails in all of the manufactured optical systems and dividing this sum by the number of these optical fibers. In the optical systems with pigtail optical fiber that is designed to have the design or nominal cut-off wavelength is 1290 nm or larger, or the design (nominal) Mac number $MAC_n$ that is smaller than 7.1, as the number (N) of the plurality of manufactured optical systems (tested to determine the average Mac number and the average cut-off wavelength) increases, the average MAC number and the average cut-off wavelength becomes a closer approximation to the actual design or nominal Mac number and the design or nominal cut-off wavelength.

It will be apparent to those skilled in the art that various modifications and adaptations can be made to the present invention without departing from the spirit and scope of this invention. Thus, it is intended that the present invention cover the modifications and adaptations of this invention, provided they come within the scope of the appended claims and their equivalents.

What is claimed is:

1. A method of assembling an optical system comprising the steps of:
   (i) selecting, from a plurality of single-mode optical fibers characterized by a nominal cut-off wavelength $\lambda_{cn}$ and actual cut-off wavelength $\lambda_c$ such that said cut-off wavelength $\lambda_c$ of each one of said plurality of single-mode optical fibers is the same as said nominal cut-off wavelength $\lambda_{cn}$ or differs from said nominal cut-off wavelength due to manufacturing tolerances, only single-mode optical fibers that have $\lambda_c > \lambda_{min}$, where $\lambda_{min}$ is a predetermined minimum acceptable cut-off wavelength of said selected single-mode optical fibers; and
   (ii) bending at least one section of at least one of said selected single-mode optical fibers such that this bent section has a bend radius R, where 12 mm<R<18 mm, wherein 1260 nm<$\lambda_{cn}$<1320 nm.

2. A method of assembling an optical amplifier comprising the steps of:
   (i) selecting from a plurality of optical fibers only fibers that satisfy the following equation $\lambda_c > \lambda_{cn} - 1.5\Delta$, where $\lambda_c$ is a cut-off wavelength of each of said selected fibers, $\Delta$ is a standard deviation of cut-off wavelengths $\lambda_c$, and $\lambda_{cn}$ is a common nominal cut-off wavelength of said plurality of optical fibers the cut-off wavelength $\lambda_c$ of each one of said plurality of fibers being the same as the nominal cut-off wavelength $\lambda_{cn}$ or differing from the nominal cut-off wavelength due to manufacturing tolerances; and
   (ii) bending at least one section of at least one of said selected fibers such that this bent section has a bend radius R, where 12 mm<R<18 mm, wherein 1260 nm≦$\lambda_{cn}$≦1320 nm.

3. A method of assembling an optical amplifier comprising the steps of:
   (i) selecting from a plurality of optical fibers only fibers that satisfy the following equation $\lambda_c > \lambda_{cn} - 1.5\Delta$, where $\lambda_c$ is a cut-off wavelength of each of said selected fibers, $\Delta$ is a standard deviation of cut-off wavelengths $\lambda_c$, and $\lambda_{cn}$ is a common nominal cut-off wavelength of said plurality of optical fibers the cut-off wavelength $\lambda_c$ of each one of said plurality of fibers being the same as the nominal cut-off wavelength $\lambda_{cn}$ or differing from the nominal cut-off wavelength due to manufacturing tolerances; and
   (ii) bending at least one section of at least one of said selected fibers such that this bent section has a bend radius R, where 12 mm<R<18 mm, wherein $\lambda_c \geq \lambda_{cn}$ and 1260 nm<$\lambda_{cn}$<1320 nm.

4. A method of assembling an optical amplifier comprising the steps of:
   (i) selecting from a plurality of optical fibers only fibers that satisfy the following equation $\lambda_c > \lambda_{cn} - 1.5\Delta$, where $\lambda_c$ is a cut-off wavelength of each of said selected fibers, $\Delta$ is a standard deviation of cut-off wavelengths $\lambda_c$, and $\lambda_{cn}$ is a common nominal cut-off wavelength of said plurality of optical fibers the cut-off wavelength $\lambda_c$ of each one of said plurality of fibers being the same as the nominal cut-off wavelength $\lambda_{cn}$ or differing from the nominal cut-off wavelength due to manufacturing tolerances; and
   (ii) bending at least one section of at least one of said selected fibers such that this bent section has a bend radius R, where 12 mm<R<18 mm wherein $\lambda_c \geq \lambda_{cn}$ and $\lambda_{cn}$=1280 nm.

5. A method of assembling an optical system comprising the steps of:
   (i) manufacturing a plurality of optical fibers, said fibers being single-mode fibers that are characterized by a cut-off wavelength $\lambda_c$, and a common nominal cut-off wavelength $\lambda_{cn}$ such that said cut-off wavelength $\lambda_c$ of each of said optical fibers is the same as said nominal cut-off wavelength $\lambda_{cn}$ or differs slightly from the nominal cut-off wavelength due to manufacturing tolerances;
   (ii) selecting from said plurality of optical fibers only optical fibers that satisfy the following equation $\lambda_c > \lambda_{min}$, where $\lambda_{min}$ is a predetermined minimum acceptable cut-off wavelength of said selected single-mode fibers;
   (iii) and bending at least one section of at least one of said selected optical fibers such that this bent section has a bend radius R, where 12 mm<R<18 mm;
   wherein 1260 nm≦$\lambda_{cn}$≦1320 nm.

6. The method according to claim 5, wherein $\lambda_{cn}$=1280 nm.

7. A method of assembling an optical amplifier comprising the steps of:
   (i) manufacturing a plurality of optical fibers, said optical fibers being single-mode fibers that have a common nominal cut-off wavelength $\lambda_{cn} \geq 1290$ nm; and
   (ii) bending at least one section of at least one of said optical fibers such that this bent section has a bend radius R, where 12 mm$\leq$R$\leq$18 mm, wherein $\lambda_{cn}\leq$1320 nm.

8. A method of assembling an optical amplifier comprising the steps of:
   (i) selecting from a plurality of optical fibers only fibers that satisfy the following equation MAC<$MAC_n$, where MAC is a Mac number of each of said selected fibers and $MAC_n$ is a common nominal Mac number of said plurality of optical fibers; said plurality of fibers being single-mode fibers such that the Mac number of each one of said plurality of fibers is the same as the nominal Mac number $MAC_n$ or differs from the nominal Mac number due to manufacturing tolerances; and
   (ii) bending at least one section of at least one of said selected fibers such that this bent section has a bend radius R, where 12 mm<R<18 mm; and
   (iii) attaching said at least one of said selected fibers with a bent section to an optical component of said optical amplifier, wherein 7.0$\leq MAC_n\leq$7.2.

9. A method according to claim 8, wherein $MAC_n$=7.1.

10. A method of assembling an optical system comprising the steps of:
   (i) manufacturing a plurality of optical fibers each characterized by a Mac number, said fibers being single-mode fibers that are characterized by a common nominal Mac number $MAC_n$, such that the Mac number of each of said fibers is the same as the nominal Mac number $MAC_n$ or differs from the nominal Mac number $MA_n$ due to manufacturing tolerances;
   (ii) selecting from said fibers only fibers that satisfy the following equation MAC<$MAC_n$+$\Delta$, where $\Delta$ is a standard deviation of Mac numbers of said plurality of optical fibers; and
   (iii) bending at least one section of at least one of said selected fibers such that this bent section has a bend radius R, where 12 mm<R<18 mm, wherein 7.0$\leq MAC_n\leq$7.2.

11. The method of claim 10, wherein $MAC_n$=7.1.

12. A method of assembling an optical amplifier comprising the steps of:
   (i) manufacturing a plurality of optical fibers, said fibers being single-mode fibers that are characterized by a common nominal Mac number $MAC_n$ that is smaller than 7.05; and
   (ii) bending at least one section of at least one of said fibers such that this bent section has a bend radius R, where 12 mm$\leq$R$\leq$18 mm.

13. The method of claim 12 wherein $MAC_n\leq$7.0.

14. A method of assembling an optical amplifier comprising the steps of:
   (i) selecting from a plurality of optical fibers only fibers that satisfy the following equation MAC$\leq$7.0, where MAC is a Mac number of each of said selected fibers, said plurality of fibers being single-mode fibers; and
   (ii) bending at least one section of at least one of said selected fibers such that this bent section has a bend radius R, where 12 mm$\leq$R$\leq$18 mm.

15. The method according to claim 14, wherein MAC$\leq$6.9.

16. The method according to claim 15, wherein MAC$\leq$6.8.

17. An optical system selected from a least 10 optical systems which are identical except for differences due to manufacturing tolerances, each of said optical systems including optical fiber pigtails having:
   (i) a bend radius R, such that 12 mm<R<18 mm,
   (ii) a common nominal design Mac number $MAC_n$; and
   (iii) an actual Mac number MAC, such that the actual Mac number MAC of each of said fibers pigtails is the same or smaller than said common nominal design Mac number $MAC_n$, wherein 7.0<$MAC_n$<7.2.

18. An optical amplifier selected from at least 10 optical amplifiers that are identical except for differences due to manufacturing tolerances, each of said optical amplifiers including optical fiber pigtails having:
   (i) a bend radius R, such that 12 mm$\leq$R$\leq$18 mm, and
   (ii) a Mac number MAC, such that MAC$\leq$7.1.

19. The optical amplifier of claim 18, wherein MAC$\leq$7.0.

20. The optical amplifier of claim 19, wherein MAC$\leq$6.9.

21. The optical amplifier of claim 20, wherein MAC$\leq$6.8.

22. The optical amplifier of claim 21, wherein MAC$\leq$6.7.

* * * * *